(12) United States Patent
Dobrin

(10) Patent No.: US 7,629,994 B2
(45) Date of Patent: Dec. 8, 2009

(54) USING QUANTUM NANODOTS IN MOTION PICTURES OR VIDEO GAMES

(75) Inventor: Bruce Dobrin, Altadena, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 8 days.

(21) Appl. No.: 11/776,358

(22) Filed: Jul. 11, 2007

(65) Prior Publication Data

US 2008/0012939 A1    Jan. 17, 2008

Related U.S. Application Data

(60) Provisional application No. 60/807,058, filed on Jul. 11, 2006.

(51) Int. Cl.
*H04N 7/18* (2006.01)
*H04N 9/47* (2006.01)

(52) U.S. Cl. ..................................... 348/139

(58) Field of Classification Search .................. 348/139
See application file for complete search history.

(56) References Cited

U.S. PATENT DOCUMENTS

| | | | | |
|---|---|---|---|---|
| 4,764,668 A | * | 8/1988 | Hayard ........................ 235/470 |
| 4,905,315 A | * | 2/1990 | Solari et al. .................. 318/640 |
| 5,023,709 A | * | 6/1991 | Kita et al. ..................... 348/172 |
| 5,268,734 A | * | 12/1993 | Parker et al. ............ 356/139.06 |
| 5,485,163 A | * | 1/1996 | Singer et al. ................. 342/457 |
| 5,504,477 A | * | 4/1996 | Whitright et al. ........... 340/10.4 |
| 5,631,468 A | | 5/1997 | Dellacorna |
| 5,900,978 A | * | 5/1999 | Sagar et al. .................. 359/536 |
| 6,061,644 A | * | 5/2000 | Leis ............................. 702/153 |
| 6,236,508 B1 | | 5/2001 | Stapelbroek |
| 7,109,470 B2 | | 9/2006 | Kohler et al. |
| 2003/0189173 A1 | | 10/2003 | Kohler |
| 2005/0114073 A1 | | 5/2005 | Gobush |
| 2005/0285038 A1 | | 12/2005 | Frangioni |

OTHER PUBLICATIONS

Jon Cohen, "Alice Ting, 31, MIT, Lighting cellular movies", Technology Review, Sep./Oct. 2006.
International Search Report and Written Opinion issued in International Patent Application No. PCT/US07/73274 on Sep. 16, 2008.
Ilya Fushman, DirkEnglund, and Jelena Vuckovic, "Coupling of PbS quantum dots to photonic crystal cavities at room temperature." Applied Physics Letters, vol. 87, Article 241102 (2005).
Office Action issued in U.S. Appl. No. 11/854,455, filed Sep. 17, 2008.

* cited by examiner

*Primary Examiner*—Nhon T Diep
(74) *Attorney, Agent, or Firm*—Samuel S. Lee; Procopio, Cory, Hargreaves & Savitch LLP

(57) ABSTRACT

A quantum nanodot processing system, comprising: at least one image capture camera configured to capture scenes including actors and/or objects in a visible band; and at least one marker capture camera configured to capture motions of the actors and/or objects applied with at least one quantum nanodot (QD) marker, wherein the at least one marker capture camera is tuned to capture narrowband IR signals emitted by the at least one QD marker.

33 Claims, 9 Drawing Sheets

USING QUANTUM NANODOTS IN MOTION PICTURES OR VIDEO GAMES

CROSS-REFERENCE TO RELATED APPLICATIONS

This application claims the benefit of priority of co-pending U.S. Provisional Patent Application No. 60/807,058, filed Jul. 11, 2006, entitled "MOTION CAPTURE USING QUANTUM NANO DOTS." The disclosure of the above-referenced patent application is hereby incorporated by reference.

BACKGROUND

1. Field of the Invention

The present invention relates generally to quantum nanodots, and more particularly to using such quantum nanodots in motion pictures or video games.

2. Description of the Prior Art

Motion capture systems are used to capture the movement of a real object and map it onto a computer generated object. Such systems are often used in the production of motion pictures and video games for creating a digital representation of a person for use as source data to create a computer graphics ("CG") animation. In a typical system, an actor wears a suit having markers attached at various locations (e.g., having small reflective markers attached to the body and limbs) and digital cameras record the movement of the actor from different angles while illuminating the markers. The system then analyzes the images to determine the locations (e.g., as spatial coordinates) and orientation of the markers on the actor's suit in each frame. By tracking the locations of the markers, the system creates a spatial representation of the markers over time and builds a digital representation of the actor in motion. The motion is then applied to a digital model, which may then be textured and rendered to produce a complete CG representation of the actor and/or performance. This technique has been used by special effects companies to produce realistic animations in many popular movies.

Tracking the locations of markers, however, is a difficult task. The difficulties compound when a large number of markers is used and multiple actors populate a capture volume.

Quantum nanodot markers have been used to measure golf ball flight characteristics and club head swing characteristics. For example, U.S. Patent Publication No. 2005/0114073 discloses a monitor system that measures flight characteristics of at least one object moving in a predetermined field-of-view using fluorescent properties of markers such as quantum nanodots. This system uses fluorescent properties exhibited by quantum nanodots that when radiated by light of a certain wavelength the quantum nanodots immediately re-radiate at broad spectrum of wavelengths causing the quantum nanodots to brightly fluoresce. These properties allow the monitor system to track the trajectory of a very brightly radiating golf ball.

SUMMARY

Embodiments of the present invention include systems, methods, apparatus, and computer programs to implement techniques of processing quantum nanodots used as markers.

In one aspect, a quantum nanodot processing system is disclosed. The system includes: at least one image capture camera configured to capture scenes including actors and/or objects in a visible band; and at least one marker capture camera configured to capture motions of the actors and/or objects applied with at least one quantum nanodot (QD) marker, wherein the at least one marker capture camera is tuned to capture narrowband IR signals emitted by the at least one QD marker.

In another aspect, a method of processing quantum nanodots used as markers is disclosed. The method includes: capturing scenes including actors and/or objects in a visible band; and capturing motions of the actors and/or objects applied with at least one QD marker tuned to emit narrowband IR signals.

In another aspect, an apparatus for processing quantum nanodots used as markers is disclosed. The apparatus includes: means for capturing scenes including actors and/or objects in a visible band; and means for capturing motions of the actors and/or objects applied with at least one QD marker tuned to emit narrowband IR signals.

In yet another aspect, a computer program, stored in a computer-readable storage medium, for processing quantum nanodots used as markers, is disclosed. The program includes executable instructions that cause a computer to: capture scenes including actors and/or objects using at least one image capture camera tuned to the visible band; and capture motions of the actors and/or objects applied with at least one QD marker tuned to emit narrowband IR signals using at least one marker capture camera tuned to capture the narrowband IR signals.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which.

DETAILED DESCRIPTION

Figure 1:
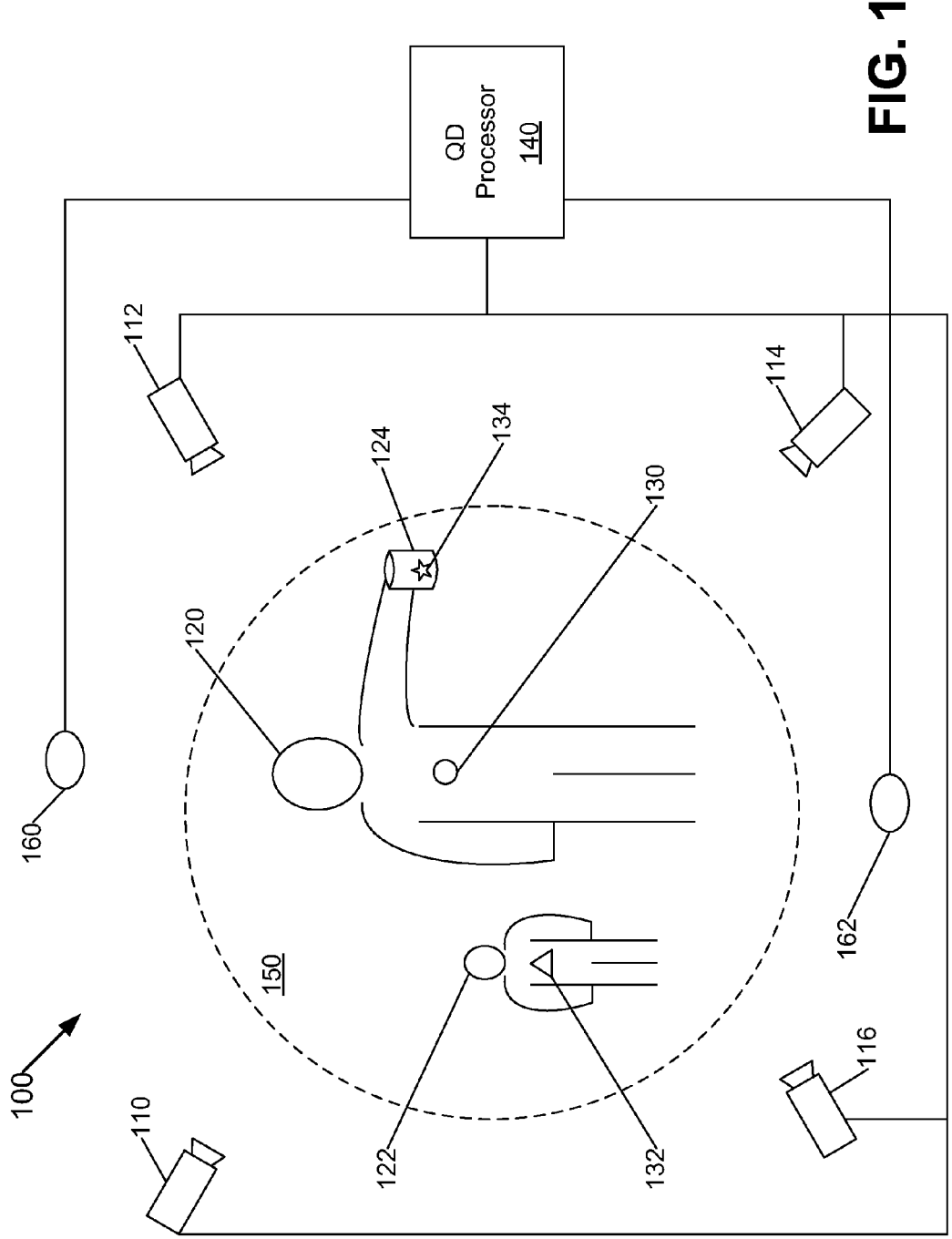
FIG. 1 illustrates a QD processing system using quantum nanodots in accordance with one implementation.

Certain implementations as disclosed herein provide for systems and methods to implement a technique for using quantum nanodots (sometimes referred to as quantum dots or "QDs") as markers (i.e., QD markers) in motion pictures or video games. Quantum nanodots are nano-crystalline structures that can be tuned to emit light of one of a variety of wavelengths that is longer than the wavelength of light used to excite the QDs. Thus, a number of capture objects each equipped with markers made of uniquely tuned QDs can be excited together under a single light.

For example, one method as disclosed herein utilizes a quantum nanodot ("QD") processing system to capture the motion and surfaces of multiple actors and/or objects using infrared ("IR") cameras and quantum nanodots attached to the actors and objects. The QD processing system builds motion and/or other hidden data from the captured IR images; and may include at least one image capture camera which records scenes as would be seen by a human audience. The QD processing system integrates the motion/hidden data with the recorded visible scenes.

Features provided in implementations include, but are not limited to, configuring and processing the quantum nanodots and cameras to produce integrated scenes/images for motion pictures or video games.

After reading this description it will become apparent to one skilled in the art how to practice the invention in various alternative implementations and alternative applications. However, although various implementations of the present invention will be described herein, it is understood that these embodiments are presented by way of example only, and not limitation. As such, this detailed description of various alternative implementations should not be construed to limit the scope or breadth of the present invention as set forth in the appended claims.

As mentioned above, quantum nanodots are nano-crystalline structures that can be tuned to emit light of a wavelength that is longer than the wavelength of light used to excite the QD markers. Thus, when a photon or an electron excites the QD, the QD is quantum shifted to a higher energy state. On returning to the ground state, the QD emits a photon of a specific frequency. The QD can be tuned by varying the structure and size of the nano-crystal to any wavelength that is longer than the wavelength of the exciting photon. For example, in one implementation, the QDs are tuned so that when they are illuminated or excited with light of a visible wavelength (approximately 700 nm for red to 400 nm for violet), the light is quantum shifted by the QDs to emit narrowband (~5 to 10 nm width) of IR (~750 nm to 1000 μm) or near-IR (~750 nm to 1400 nm) signal.

By tuning the QDs as described above, the QDs can be used as markers in a QD processing system. In one implementation, the IR cameras are configured to capture the motion and surfaces of multiple actors and/or objects using QD markers attached to the actors/objects. In another implementation, the IR cameras are configured so that each IR camera detects different QD marker(s) tuned to a specific IR frequency. This implementation allows the IR cameras to discriminate between actors/objects within a capture volume. For example, three QD markers tuned to emit IR signals are attached to three different actors, and three IR marker capture cameras, each configured to capture only one QD marker, are used to discriminate between three actors.

FIG. 1 illustrates a QD processing system 100 using quantum nanodots in accordance with one implementation. In the illustrated implementation, the QD processing system 100 includes a capture volume 150 surrounded by an image capture camera 110 (sometimes referred to as "film" camera), a plurality of marker capture cameras 112, 114, 116 (sometimes referred to as "witness" cameras), a plurality of illumination sources (e.g., lights) 160, 162, and a QD processor 140.

The image capture camera 110 can be configured as any camera tuned to a visible wavelength range. Thus, the image capture camera 110 can be a camera configured to capture and record scenes in the visible band onto a film. However, the image capture camera 110 can also be a camera configured to digitally capture and record scenes in the visible band onto a digital recording media.

Figure 2A:
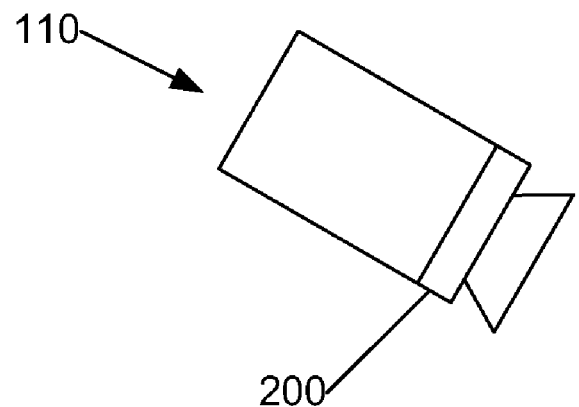
FIGS. 2A and 2B show an image capture camera and a filter tuned to receive light in the visible wavelength range.
Figure 2B:
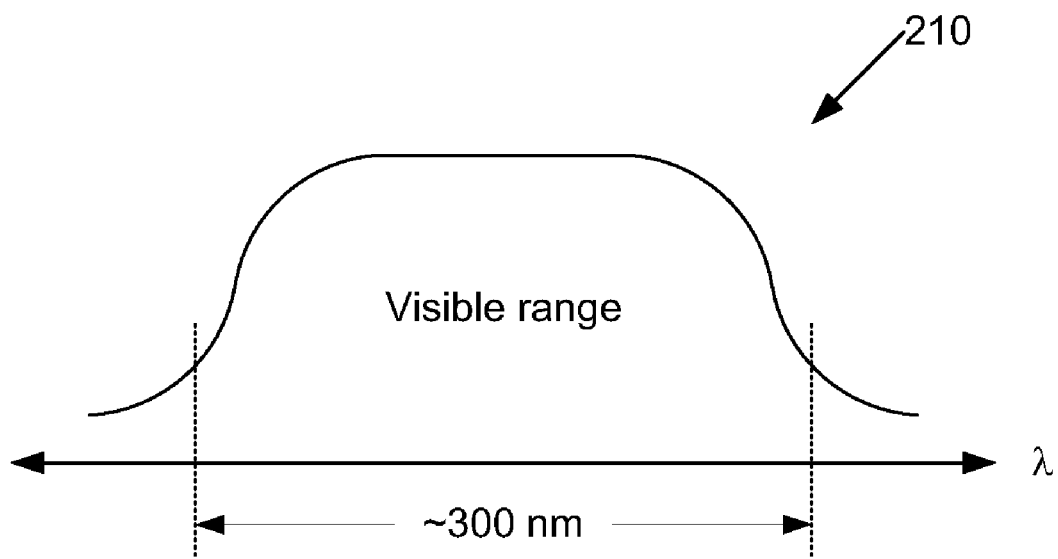

In one implementation shown in FIG. 2A, the image capture camera 110 includes a filter 200 which is tuned to receive light in the visible wavelength range 210 (see FIG. 2B). Thus, the filter 200 is tuned to receive light of approximately 300 nm in width in the visible band but to reject signals in other bands such as in the IR band. This configuration of the image capture camera 110 keeps the QD markers virtually invisible to the image capture camera 110 so that the actors and/or objects can be marked with "hidden" markers. In other implementations, multiple image capture cameras are used.

The marker capture cameras 112, 114, 116, in one implementation, are configured as IR or near-IR cameras to capture motions of capture objects 120, 122, 124. Typically, the capture objects are actors 120, 122 with QD markers 130, 132 attached at various locations on the actors' body. However, the capture objects can be non-animate objects, such as props and/or animals (e.g., a can of soda 124 with QD marker 134). In a particular implementation, the IR cameras 112, 114, 116 are configured to label or mark actors and/or objects in a scene so that the actors and/or objects can be later replaced, deleted, or inserted. For example, a can of soda 124 is labeled with QD marker 134 in a scene of a movie so that the label on the can of soda can be inserted even after the movie is finished. This can be done when an advertising sponsor for the soda is expected to be found after the production of the movie is finished.

In another implementation, the marker capture cameras are configured as machine vision cameras optimized for QD emissions. For example, machine vision cameras are used to discriminate parts on a conveyor belt. Thus, the parts are coated with tuned QD material so that the QD processing system can appropriately separate the parts for further processing.

In some implementations, the image capture camera 110 and the marker capture cameras 112, 114, 116 can be configured as a single camera unit providing a dual capability of capturing visible band images and narrowband IR signals.

Figure 3A:
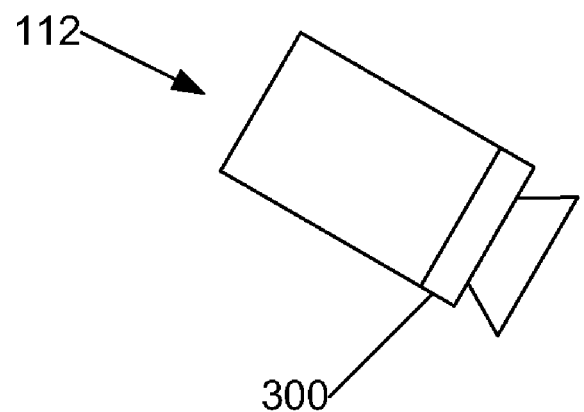
FIGS. 3A and 3B show a marker capture camera and a filter tuned to receive signals in an IR wavelength range.
Figure 3B:
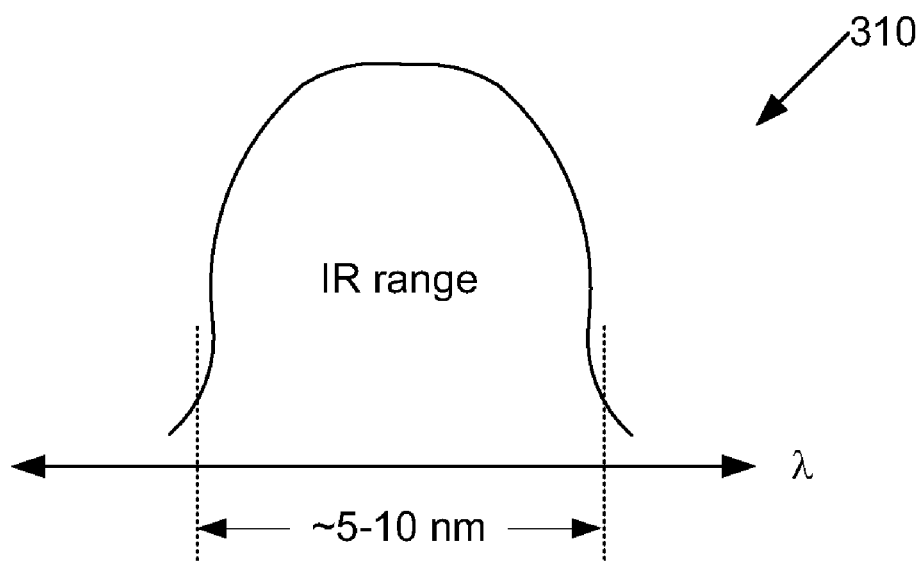

FIG. 3A illustrates the marker capture camera 112 with a filter 300 tuned to receive signals in an IR wavelength range 310 (see FIG. 3B). Thus, the filter 300 is tuned to receive signals of approximately 5 to 10 nm in width in the IR band but reject signals in other bands such as in the visible band and other IR bands. By rejecting light in the visible band (i.e., the illumination source and other reflected light sources), the IR camera 112 can easily detect particular QD marker(s) tuned to be received by the IR camera 112. Other marker capture cameras 114, 116 can be configured similarly to the marker capture camera 112. These configurations of the marker capture cameras 112, 114, 116 allow the QD processor 140 to capture and track motions of several actors/objects simultaneously and accurately using QD markers as markers.

In one implementation, the narrowband filter 300 (tuned to the frequency of one of the QD emissions) of the IR camera 112 is positioned between the focal plane and the lens. In another implementation, the filter 300 is positioned in front of the lens.

Figure 4A:
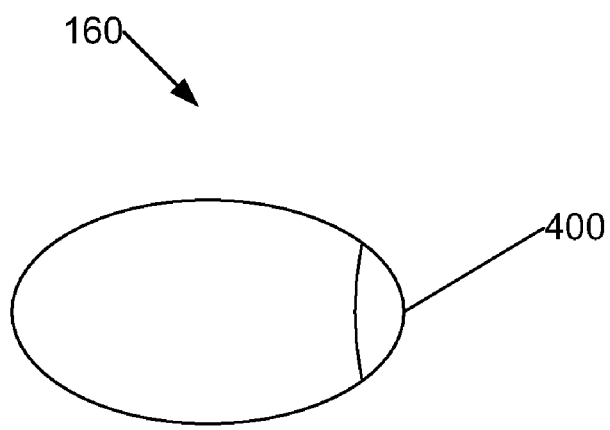
FIGS. 4A and 4B show an illumination source configured to excite QD markers in a capture volume and a filter tuned to excite QD markers with light in the visible wavelength range.
Figure 4B:
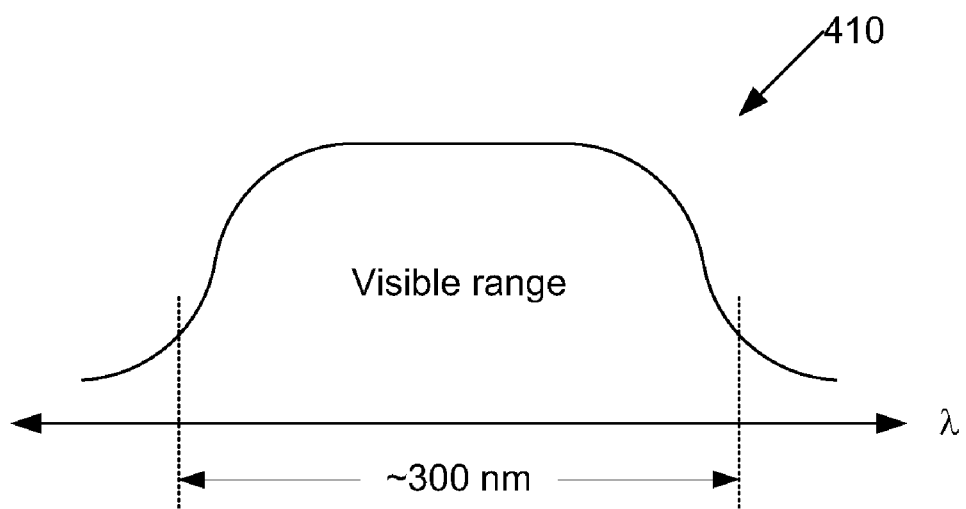

FIG. 4A shows an illumination source 160 configured to excite QD markers 130, 132, 134 in the capture volume 150 in accordance with one implementation. The illumination source 160 includes a filter 400 so that the QD markers are excited with tuned light in the visible wavelength range 410 (see FIG. 4B). Thus, the filter 400 is tuned to radiate light of approximately 300 nm in width in the visible band but reject signals in other bands such as in the IR band. The illumination source 162 can be configured similarly to the illumination source 160.

In some implementations, the room lights are also filtered to remove frequencies that would fall in the emission frequency range. Since this range is expected to be in the invisible to lower red range of the spectrum, the room filtering should be unnoticed by personnel or equipment in the room.

Motion capture systems using retro-reflective materials often require a large array of high resolution cameras running at high frame rates to track the materials placed on the actors/objects. Interference from the illumination source and improper reflections require strong general filters, electronic cancellation of known interference sources, and a reduction in the effectiveness of the system. Accordingly, relatively expensive ring lights are often used as illumination sources in a typical motion capture system.

By contrast, inexpensive lights or even ambient light can be used as illumination sources in a QD processing system. This is because the QD markers can be tuned to absorb small quantity of excitation light and quantum shift the light to emit IR signals which can be easily detected by an IR camera. Since the IR camera (finely tuned to a narrowband IR signal) is not affected by the excitation light (i.e., the illumination source usually tuned to the visible band), the QD markers can be easily detected even when they do not reflect bright visible light.

In another implementation, QD markers can be configured as quantum nanodot LEDs ("QD LEDs") or quantum nanodot electroluminescent ("EL") devices that are tunable to a specific IR frequency. Electrical current would be driven through the QD markers but QD markers would be operable even without any illumination sources (i.e., self illuminating). Thus, the QD markers will emit IR signals even when they are occluded from the illumination sources by actors/objects in the capture volume. In other implementations, other self illuminating excitation sources, such as UV lamps, are used.

In one implementation, the QD markers are suspended in water-based ink or paint which is then applied to an actor and/or object. In another implementation, the QD markers are added to any medium, such as ink, paint, plastic, clothing, temporary tattoo material, or other similar material. In another implementation, the QD markers in the ink or paint could be applied to or included in the markers that are shaped as spherical or flat disc, or applied directly to the skin of an actor. In yet another implementation, the QD markers are configured such that each QD marker forms a unique pattern. Thus, each uniquely patterned QD marker is applied to each actor/object to further discriminate objects within a capture volume. For example, in FIG. 1, QD marker 130 (a circular pattern) is applied to the actor 120, QD marker 132 (a triangular pattern) is applied to the actor 122, and QD marker 134 (a star pattern) is applied to the object 124. In a further implementation, several QD markers are configured to form a unique pattern as a group. In practice, a pattern of each QD marker is configured as different forms of a checker board design.

Figure 5:
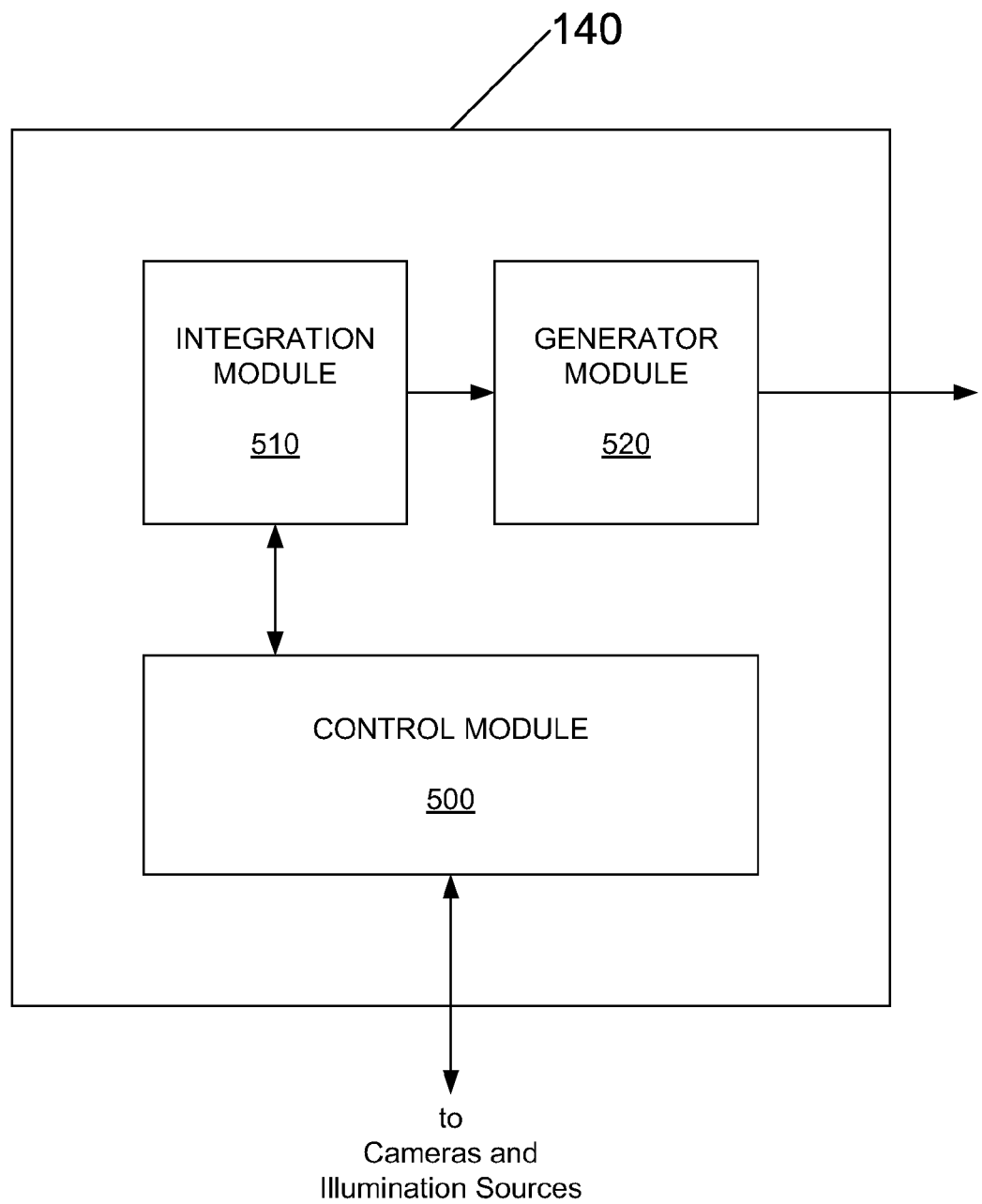
FIG. 5 is a detailed block diagram of a QD processor in accordance with one implementation.

FIG. 5 is a detailed block diagram of the QD processor 140 in accordance with one implementation. As shown, the QD processor 140 includes a control module 500, an integration module 510, and a generator module 520. The control module 500 triggers the cameras 110, 112, 114, 116 to open their shutters and/or perform capture, and the illumination sources 160, 162 to illuminate the capture volume 150 at a predetermined timing, which is usually a multiple of 24 frames per second (fps). The QD markers emit signals at the tuned frequencies. Each camera registers the position of QD marker(s) that is/are tuned for that specific camera. The control module 500 also commands the integration module 510 to collate, reconcile, and integrate the information received from each camera.

The integration module 510 integrates the scenes captured from the image capture camera 110 with the motions of the QD markers captured in narrowband IR signals by the marker capture cameras 112, 114, 116. The generator module 520 receives the integrated scenes from the integration module 510 and generates scenes marked with hidden marks. The scenes marked with hidden marks can be processed so that the actors and/or objects are later replaced, deleted, or inserted from the scenes.

In one implementation, the generated scenes marked with hidden marks form motion picture. In another implementation, the generated scenes marked with hidden marks form a video game. In another implementation, the generated scenes marked with hidden marks form a series of frames for a machine vision processing.

Figure 6:
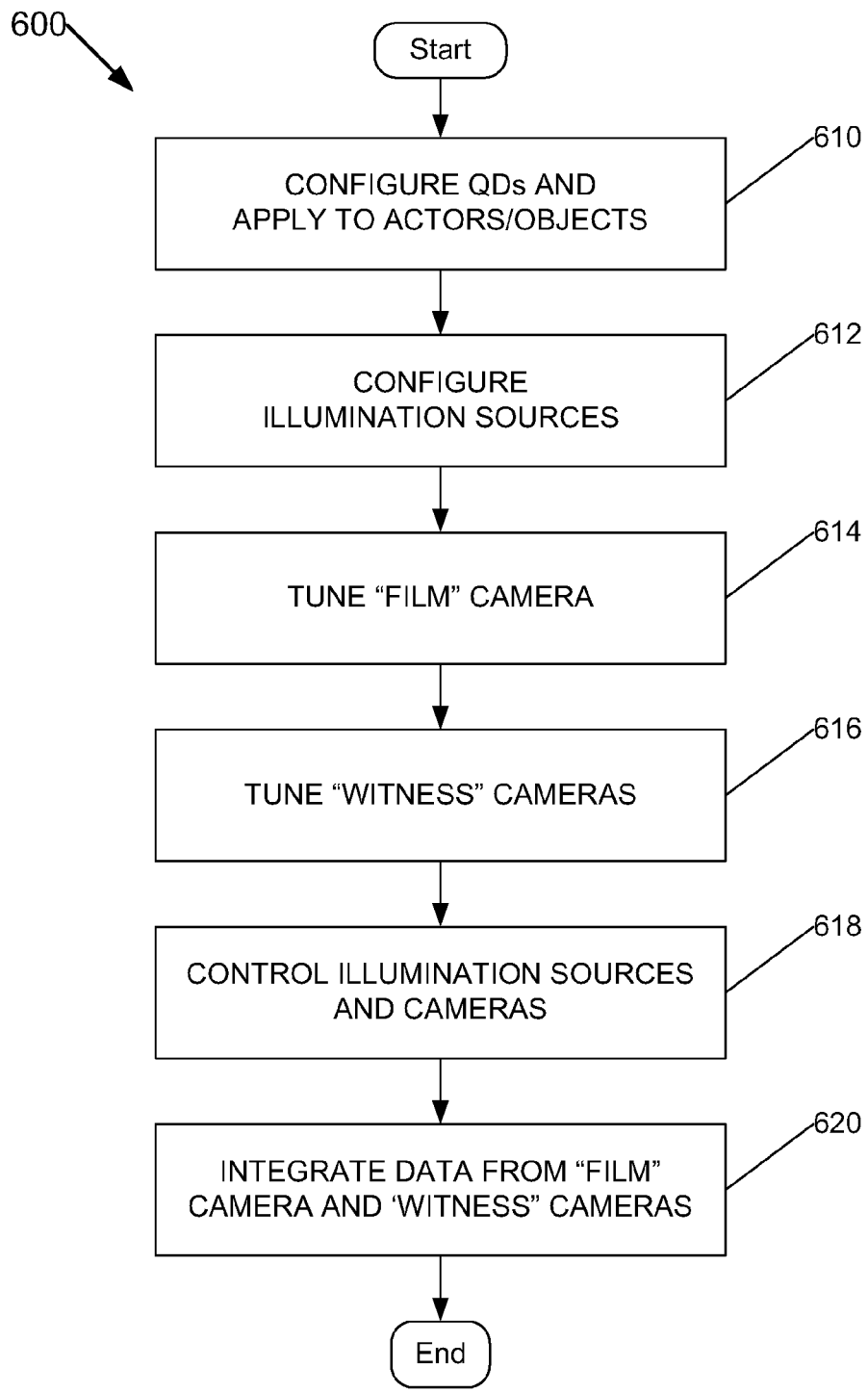
FIG. 6 is a flowchart illustrating a method of processing quantum nanodots used as markers.

FIG. 6 is a flowchart illustrating a method 600 of processing quantum nanodots used as markers. At block 610, the QD markers are configured and applied to actors and/or objects. In one implementation, as discussed above, the QD markers are tuned to emit IR signals of a narrow band to be captured by marker capture cameras. Once the QD markers are tuned, they are mixed with ink, paint, or other similar material to be applied to actors and/or objects. The illumination sources are configured, at block 612, to excite the QD markers tuned to emit narrowband IR. As discussed above, in one implementation, the illumination sources can be configured as visible or ambient light. In another implementation, the QD markers can be configured as self-illuminating with electroluminescent QD markers.

At block 614, the image capture camera is configured to capture scenes in a visible wavelength band. This allows the scenes to include hidden marks while the image capture camera captures scenes of a movie or video game. The marker capture cameras are then configured, at block 616, to capture or mark actors and/or objects within a capture volume. In one implementation discussed above, the marker capture cameras are configured as IR cameras, where each IR camera is tuned to a specific narrowband IR to detect a correspondingly-tuned QD marker.

At block 618, illumination sources and cameras are controlled to capture signals from the capture volume. For example, the cameras are triggered to open their shutters and/or perform capture, and the illumination sources are commanded to illuminate the capture volume at a predetermined timing. The QD markers emit signals at the tuned frequencies. Each camera registers the position of QD marker(s) that is/are tuned for that specific camera. Information from each camera is then collated, reconciled, and integrated, at block 620.

Figure 7A:
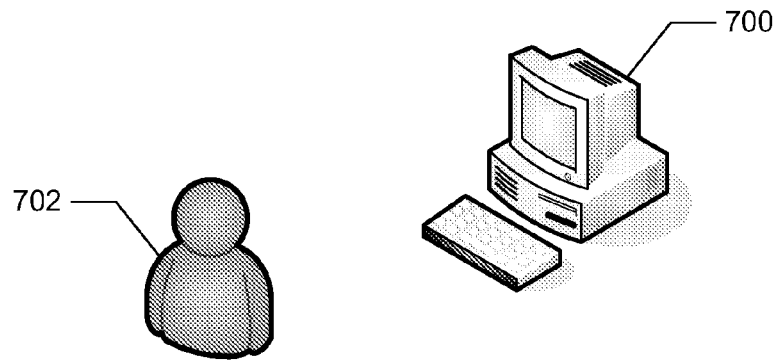
FIG. 7A illustrates a representation of a computer system and a user.

FIG. 7A illustrates a representation of a computer system 700 and a user 702. The user 702 can use the computer system 700 to process and manage quantum nanodots used as markers. The computer system 700 stores and executes a QD processing system 712, which processes QD data captured by cameras.

Figure 7B:
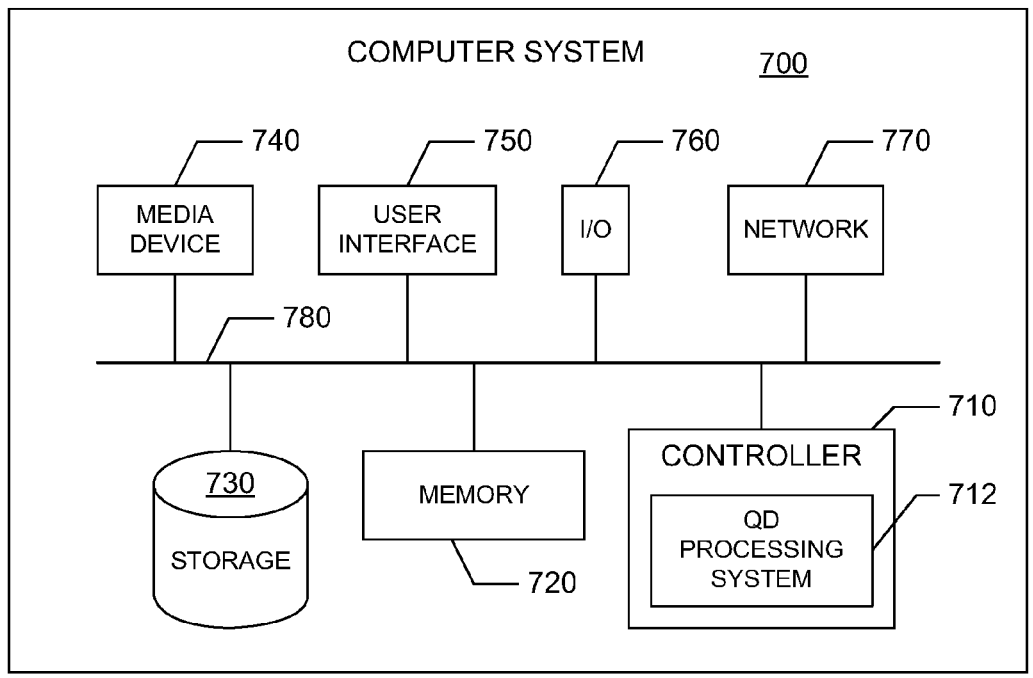
FIG. 7B is a functional block diagram illustrating the computer system hosting the QD processing system.

FIG. 7B is a functional block diagram illustrating the computer system 700 hosting the QD processing system 712. The controller 710 is a programmable processor which controls the operation of the computer system 700 and its components. The controller 710 loads instructions from the memory 720 or an embedded controller memory (not shown) and executes these instructions to control the system. In its execution, the controller 710 provides the QD processing system 712 as a software system. Alternatively, this service can be implemented as separate components in the controller 710 or the computer system 700.

Memory 720 stores data temporarily for use by the other components of the computer system 700. In one implementation, memory 720 is implemented as RAM. In another implementation, memory 720 also includes long-term or permanent memory, such as flash memory and/or ROM.

Storage 730 stores data temporarily or long term for use by other components of the computer system 700, such as for storing data used by the QD processing system 712. In one implementation, storage 730 is a hard disk drive.

The media device 740 receives removable media and reads and/or writes data to the inserted media. In one implementation, the media device 740 is an optical disc drive.

The user interface 750 includes components for accepting user input from the user of the computer system 700 and presenting information to the user. In one implementation, the user interface 750 includes a keyboard, a mouse, audio speakers, and a display. The controller 710 uses input from the user to adjust the operation of the computer system 700.

The I/O interface 760 includes one or more I/O ports to connect to corresponding I/O devices, such as external storage or supplemental devices (e.g., a printer or a PDA). In one implementation, the ports of the I/O interface 760 include ports such as: USB ports, PCMCIA ports, serial ports, and/or parallel ports. In another implementation, the I/O interface 760 includes a wireless interface for communication with external devices wirelessly.

The network interface 770 includes a wired and/or wireless network connection, such as an RJ-45 or "Wi-Fi" interface (including, but not limited to 802.11) supporting an Ethernet connection.

The computer system 700 includes additional hardware and software typical of computer systems (e.g., power, cooling, operating system), though these components are not specifically shown in FIG. 7B for simplicity. In other implementations, different configurations of the computer system can be used (e.g., different bus or storage configurations or a multi-processor configuration).

Figure 8A:
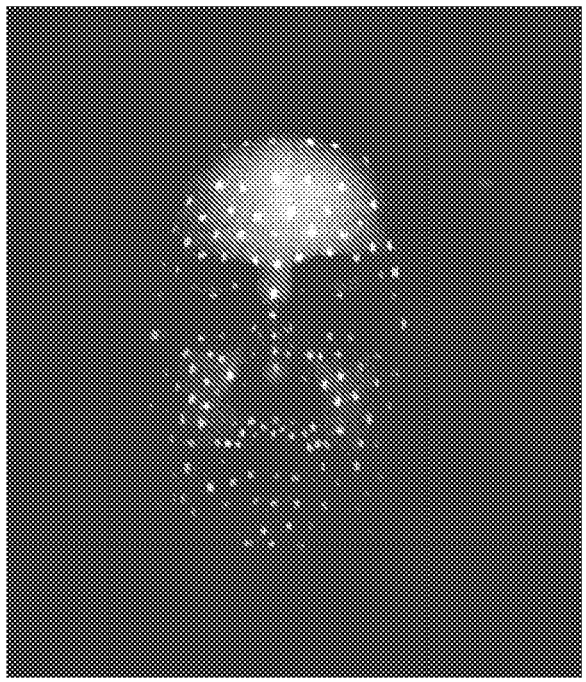
FIGS. 8A and 8B show example frames captured using QD markers tuned to 855 nm with an IR marker capture camera having a narrow bandpass filter (centered at 852 nm) in front of the lens.
Figure 8B:
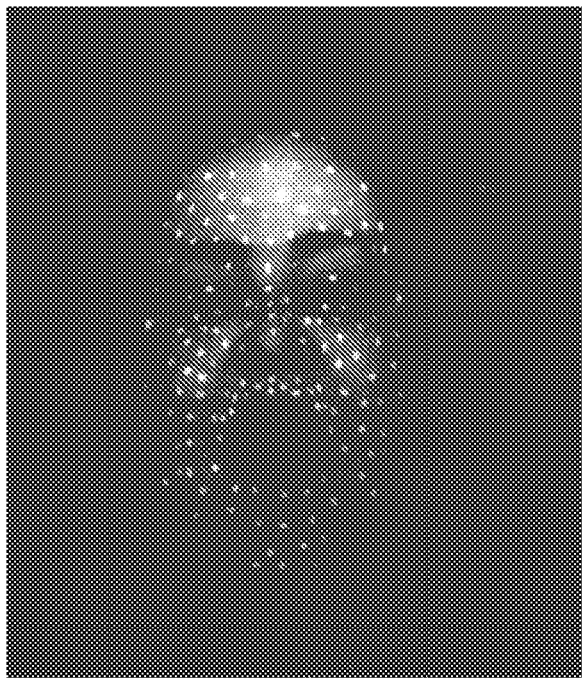
Figure 9A:
FIGS. 9A and 9B show the same frames captured without the narrow bandpass filter in front of the lens.
Figure 9B:

FIGS. 8A and 8B show example frames captured using QD markers tuned to 855 nm at 65 frames/second. The frames were captured with an IR marker capture camera having a narrow bandpass filter (centered at 852 nm) in front of the lens. FIGS. 9A and 9B show the same frames captured with wider filter than those of FIGS. 8A and 8B.

It will be appreciated that the various illustrative logical blocks, modules, and methods described in connection with the above described figures and the implementations disclosed herein have been described above generally in terms of their functionality. In addition, the grouping of functions within a module is for ease of description. Specific functions or steps can be moved from one module to another without departing from the invention.

Additional variations and implementations are also possible. For example, the integrated data from image capture and marker capture cameras can be used in applications other than movies or video games, such as advertising, online or offline computer content (e.g., web advertising or computer help systems), any other animated computer graphics video applications, or other applications including machine vision applications. In another example, the QD markers can be tuned to emit signals other than IR signals such as signals in UV, microwave, or any other frequency range.

The above descriptions of the disclosed implementations are provided to enable any person skilled in the art to make or use the invention. Various modifications to these implementations will be readily apparent to those skilled in the art, and the generic principles described herein can be applied to other implementations without departing from the spirit or scope of the invention. Thus, it will be understood that the description and drawings presented herein represent implementations of the invention and are therefore representative of the subject matter which is broadly contemplated by the present invention. It will be further understood that the scope of the present invention fully encompasses other implementations that may become obvious to those skilled in the art and that the scope of the present invention is accordingly limited by nothing other than the appended claims.

What is claimed is:

1. A quantum nanodot processing system, comprising:
   at least one image capture camera configured to capture scenes including actors and/or objects in a visible band; and
   at least one marker capture camera configured to capture motions of the actors and/or objects applied with at least one quantum nanodot (QD) marker,
   wherein a first marker and a second marker of said at least one QD marker are excited with an excitation signal of a third wavelength but the first marker is tuned to emit a narrowband IR signal of a first wavelength and the second marker is tuned to emit a narrowband IR signal of a second wavelength, and the first wavelength and the second wavelength are longer than the third wavelength of the excitation signal,
   wherein a first marker capture camera of said at least one marker capture camera is tuned to capture the narrowband IR signal of the first wavelength emitted by the first marker, and
   wherein a second marker capture camera of said at least one marker capture camera is tuned to capture the narrowband IR emitting signal of the second wavelength emitted by the second marker.

2. The quantum nanodot processing system of claim 1, wherein said at least one image capture camera and said at least one marker capture camera are configured as a single camera unit providing a dual capability of capturing the scenes in the visible band and the narrowband IR signals emitted by the at least one QD marker.

3. The quantum nanodot processing system of claim 1, further comprising
   a processor configured to control said at least one image capture camera and said at least one marker capture camera at a predetermined timing to generate frames of marked scenes.

4. The quantum nanodot processing system of claim 3, wherein the predetermined timing is 24 frames per second.

5. The quantum nanodot processing system of claim 3, wherein said processor further includes
   a control module configured to trigger said at least one image capture camera and said at least one marker capture camera to perform capture at the predetermined timing, and to receive data from said at least one image capture camera and said at least one marker capture camera.

6. The quantum nanodot processing system of claim 5, wherein the received data includes the scenes captured from said at least one image capture camera and the motions of said at least one QD marker captured in narrowband IR signals by said at least one marker capture camera.

7. The quantum nanodot processing system of claim 6, wherein said processor further includes
an integration module configured to receive commands from said control module to collate, reconcile, and to integrate the scenes captured from said at least one image capture camera and the motions of said at least one QD marker captured by said at least one marker capture camera.

8. The quantum nanodot processing system of claim 7, wherein said processor further includes
a generator module configured to receive the integrated scenes from said integration module, said generator module operating to generate scenes marked with hidden marks using the integrated scenes,
wherein the scenes marked with hidden marks are processed so that the actors and/or objects are later replaced, deleted, or inserted from the scenes.

9. The quantum nanodot processing system of claim 1, further comprising
at least one illumination source to excite said at least one QD marker with light in the visible band.

10. The quantum nanodot processing system of claim 1, wherein said at least one QD marker is configured as electroluminescent devices.

11. The quantum nanodot processing system of claim 1, wherein said at least one image capture camera includes
a filter tuned to receive light in the visible band of approximately 300 nm in width but to reject signals in all other bands.

12. The quantum nanodot processing system of claim 1, wherein said at least one marker capture camera includes
a filter tuned to receive signals of approximately 5 to 10 nm in width in the narrowband IR but to reject signals in all other bands.

13. The quantum nanodot processing system of claim 12, wherein said filter is positioned between a focal plane and lens of said at least one marker capture camera.

14. The quantum nanodot processing system of claim 1, wherein said at least one marker capture camera is configured as at least one machine vision camera.

15. The quantum nanodot processing system of claim 1, wherein said at least one QD marker is added to temporary tattoo material and applied to the actors and/or objects.

16. The quantum nanodot processing system of claim 1, wherein each QD marker of said at least one QD marker is designed with a unique pattern.

17. A method of processing quantum nanodots used as markers, the method comprising:
capturing scenes including actors and/or objects in a visible band;
tuning a first marker of at least one QD marker to emit a narrowband IR signal of a first wavelength when excited with an excitation signal of a third wavelength;
tuning a second marker of the at least one QD marker to emit a narrowband IR signal of a second wavelength when excited with an excitation signal of the third wavelength,
wherein the first wavelength and the second wavelength are longer than the third wavelength of the excitation signal;
exciting the first marker and the second marker; and
capturing motions of the actors and/or objects applied with the first marker tuned to emit the narrowband IR signal of the first wavelength, and
capturing motions of the actors and/or objects applied with the second marker timed to emit the narrowband IR signal of the second wavelength.

18. The method of claim 17, wherein said capturing scenes in a visible band includes
using at least one image capture camera tuned to the visible band.

19. The method of claim 18, further comprising
controlling the at least one image capture camera and the at least one marker capture camera at a predetermined timing to generate frames of marked scenes.

20. The method of claim 19, wherein said controlling further includes:
triggering the at least one image capture camera and the at least one marker capture camera to perform capture at the predetermined timing; and
receiving data from the at least one image capture camera and the at least one marker capture camera.

21. The method of claim 20, wherein said receiving data includes:
receiving the scenes captured from the at least one image capture camera; and
receiving the motions of the at least one QD marker captured in narrowband IR signals by the at least one marker capture camera.

22. The method of claim 21, further comprising:
receiving commands to collate, reconcile, and integrate the scenes and the motions; and
generating scenes marked with hidden marks using the integrated scenes.

23. The method of claim 22, further comprising
processing the scenes marked with hidden marks so that the actors and/or objects are later replaced, deleted, or inserted from the scenes.

24. The method of claim 18, further comprising
illuminating the at least one QD marker with light in the visible band.

25. The method of claim 18, further comprising
configuring the at least one QD marker as self illuminating electroluminescent devices.

26. The method of claim 18, wherein each QD marker of the at least one QD marker is designed with a unique pattern.

27. An apparatus for processing quantum nanodots used as markers, the apparatus comprising:
means for capturing scenes including actors and/or objects in a visible band;
means for tuning a first marker of at least one QD marker to emit a narrowband IR signal of a first wavelength when excited with an excitation signal of a third wavelength;
means for tuning a second marker of the at least one QD marker to emit a narrowband IR signal of a second wavelength when excited with an excitation signal of the third wavelength,
wherein the first wavelength and the second wavelength are longer than the third wavelength of the excitation signal;
means for exciting the first marker and the second marker; and
means for capturing motions of the actors and/or objects applied with the first marker tuned to emit the narrowband IR signal of the first wavelength, and for capturing motions of the actors and/or objects applied with the second marker tuned to emit the narrowband IR signal of the second wavelength.

28. A computer program, stored in a computer-readable storage medium, for processing quantum nanodots used as markers, the program comprising executable instructions that cause a computer to:
capture scenes including actors and/or objects using at least one image capture camera tuned to the visible band;

tune a first marker of at least one QD marker to emit a narrowband IR signal of a first wavelength when excited with an excitation signal of a third wavelength;

tune a second marker of the at least one QD marker to emit a narrowband IR signal of a second wavelength when excited with an excitation signal of the third wavelength, wherein the first wavelength and the second wavelength are longer than the third wavelength of the excitation signal;

excite the first marker and the second marker; and capture motions of the actors and/or objects applied with the second marker tuned to emit the narrowband IR signals of the first wavelength, and capture motions of the actors and/or objects applied with the second marker tuned to emit the narrowband IR signal of the second wavelength, wherein motions of the actors and/or objects are captured using at least one marker capture camera tuned to capture narrowband IR signals.

29. The computer program of claim 28, further comprising executable instructions that cause a computer to control the at least one image capture camera and the at least one marker capture camera at a predetermined timing to generate frames of marked scenes.

30. The computer program of claim 29, further comprising executable instructions that cause a computer to:

trigger the at least one image capture camera and the at least one marker capture camera to perform capture at a predetermined timing; and receive data from the at least one image capture camera and the at least one marker capture camera.

31. The computer program of claim 30, wherein the received data includes the scenes captured by the at least one image capture camera and the motions of the at least one QD marker captured in narrowband IR signals by the at least one marker capture camera.

32. The computer program of claim 31, further comprising executable instructions that cause a computer to:

receive commands to collate, reconcile, and integrate the scenes and the motions; and generate scenes marked with hidden marks using the integrated scenes.

33. The computer program of claim 32, further comprising executable instructions that cause a computer to:

process the scenes marked with hidden marks so that the actors and/or objects are later replaced, deleted, or inserted from the scenes.

\* \* \* \* \*